W. REDHEFFER.
Ice-Cream Freezer.
No. 165,615.                                   Patented July 13, 1875.
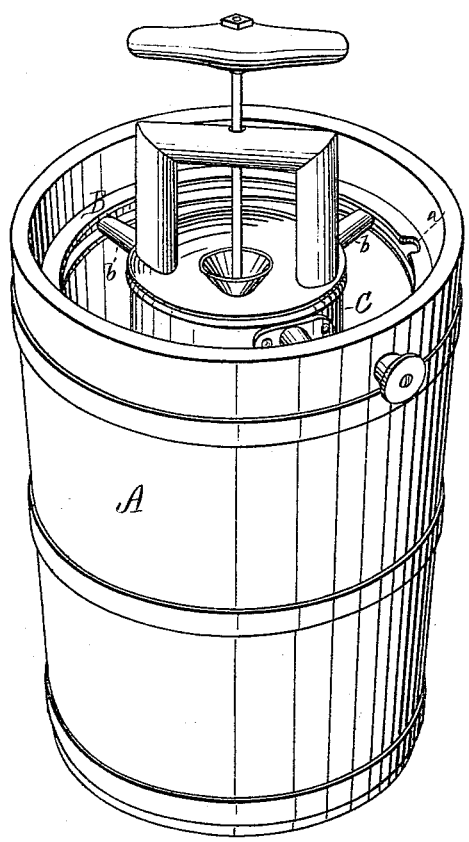
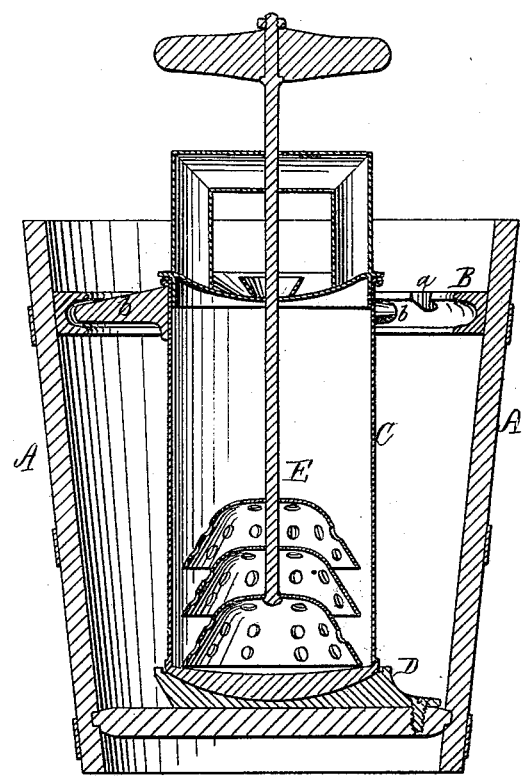

UNITED STATES PATENT OFFICE.

WILLIAM REDHEFFER, OF ST. LOUIS, ASSIGNOR OF TWO-THIRDS HIS RIGHT TO WASHINGTON H. CHICK, OF ST. LOUIS, AND JOSEPH S. CHICK, OF KANSAS CITY, MISSOURI.

IMPROVEMENT IN ICE-CREAM FREEZERS.

Specification forming part of Letters Patent No. 165,615, dated July 13, 1875; application filed December 4, 1874.

*To all whom it may concern:*

Be it known that I, WILLIAM REDHEFFER, of the city and county of St. Louis, in the State of Missouri, have invented certain new and useful Improvements in Ice-Cream Freezers and Churns; and I do hereby declare that the following specification, taken in connection with the drawings furnished and forming a part of the same, is a clear, true, and accurate description thereof.

The object of my invention is to produce an apparatus adapted to family use and interchangeably applicable to the freezing of ice-cream and churning.

It is well known that under some circumstances the temperature of cream for churning should be varied, and that water of required temperature has often been employed for inclosing the receptacle containing the cream. It is equally well known that cream preliminary to freezing should be agitated to prevent lumpy and irregular congelation, and that dashers or stirrers of various forms have been employed in connection with freezers.

My invention consists in the combination, with a tight tub which is provided with an interior-grooved ring, of a can which is provided with radial arms, which loosely enter the grooved ring, whereby the can may be freely rotated and held in a central position within the tub, whether the same be charged with ice for freezing or water when churning, and maintained in a rigid vertical position when the dasher is operated for agitating the cream for freezing or rapidly reciprocated for churning; also, in the combination with such a tub and can, of a raised base on the bottom of the tub, for supporting the can during its rotation in freezing and maintaining it in a firm vertical position when churning, and during the latter operation permitting a free circulation of water around the bottom of the can; also, in the combination with a tub and can provided with a grooved ring, of a dasher or beater composed of several perforated hollow frustums of cones, substantially like those described in Letters Patent issued to me January 20, 1874, No. 146,710, whereby the agitation of cream during the freezing operation may be readily effected, the cream properly beaten for the separation of butter therefrom, and also whereby eggs may be properly beaten when they are used in the manufacture of ice-cream or frozen custard.

To more particularly describe my invention, I will refer to the drawings, in which—

Figure 1 represents my freezer and churn in perspective. Fig. 2 represents the same in central vertical section.

A denotes the ice and water tub. It is of the usual construction. B denotes a grooved ring, which is fitted to the interior of the tub and secured thereto at a proper point hereafter fully described. The ring, in practice, is made of cast-iron, with the upper side cut away at several points, as at $a$. Flanges are cast with the ring for securing it by means of screws to the tub. C denotes the can. It is in practice constructed of heavy tin plate and provided with a heavy leaded bottom convex in outline, as shown, similar to others long in use. At or near its upper end it is provided with several radial arms, $b$, which, on being entered at the openings $a$ in the ring, will occupy the groove therein. The groove is located at a distance from the bottom of the tub, which is practically equal to the distance between the ends of the arms and the bottom of the can, and the height of the raised base at D on the bottom of the tub. The raised base D is preferably composed of cast-iron, and is secured to the bottom of the tub by screws. Its upper surface is concave, and corresponds generally with the convex surface of the bottom of the can. When in position it will be seen that whether the tub is empty or filled with ice or water that the can is firmly maintained at the bottom centrally by the base D, and at the top in like manner by the radial arms and the grooved ring. While in this position it can be readily rotated, at the same time is held firmly during the reciprocating action of the beater E.

It is one of the vexatious experiences of housekeepers to lift the cover from a freezer as ordinarily constructed. With my radial arms and the grooved ring the can is firmly held against vertical movement, permitting the cover to be lifted readily, however close or tight it may be fitted. Another frequent and disagreeable occurrence liable to freezers as ordinarily constructed consists in the floating and tilting of the can as the ice melts, permitting the entrance of salt water to the cream. With my freezer the can is so held under all circumstances that no salt water can possibly enter.

It is well known that, in order to secure smooth-grained ice-cream, the cream should be agitated gently during the preliminary stages. The beater E, composed of several perforated hollow frustums of cones, substantially as described in my Letters Patent herein referred to, is specially valuable in this connection, as the cream is slowly forced in jets or streams through the holes in the beater and driven against the inner walls of the can. The downward-projecting edges of the beater scrape and clear the solidified cream from the sides of the can and mix that portion with the liquid in a manner believed by me to be novel in the art, resulting in a superior article of ice-cream. When the cream has been properly agitated the detachable cross-bar is removed from the beater, the cover lifted from the can, and the beater withdrawn, after which the cover is replaced, and a few rotations of the can completes the freezing operation.

In the manufacture of that class of ice-cream into which eggs enter as components the eggs can by this beater be first stiffly beaten, and then well mixed with the sugar, cream, milk, and arrow-root, or similar matter, and agitated as before described. In churning, the beater has a value closely analogous to that in connection with egg-beating. The cream is forcibly and continuously driven in small streams outward from the center, against the sides of the can, which results in the speedy separation of the butter from the cream.

It will be seen that whether my apparatus be used as a freezer or a churn, that all of its elements are employed and have a specific value in both uses, and hence it constitutes a valuable interchangeable apparatus for either use, which can be afforded at light cost, and thereby meet the frequent demand of housekeepers for domestic apparatus possessing varied functions and capable of varied uses.

Having thus described my invention, I claim as new—

1. The combination, with a tight tub, provided with an interior-grooved ring, of a can provided with radial arms which are arranged to enter and occupy the groove in said ring, substantially as described.

2. The combination, with a tub having a grooved interior ring and a can having radial arms, of the raised base D, substantially as described.

3. The freezing and churning apparatus, consisting of the combination of the tub with grooved ring, the can with radial arms, and the beater, consisting of the series of perforated hollow frustums of cones, substantially as described.

WILLIAM REDHEFFER.

Witnesses:
PHILIP F. LARNER,
JNO. D. PATTEN.